United States Patent [19]

Ogawa et al.

[11] 3,912,457

[45] Oct. 14, 1975

[54] TEST STRIP FOR HEPATIC DISEASES

[75] Inventors: Yasunao Ogawa, Ikeda; Yukio Yonetani, Nara; Hideyuki Maekawa, Osaka; Kaoru Ishitobi, Yao, all of Japan

[73] Assignee: Shionogi & Co., Ltd., Osaka, Japan

[22] Filed: June 21, 1974

[21] Appl. No.: 481,911

[30] Foreign Application Priority Data

Mar. 15, 1974 Japan ................................ 49-30389

[52] U.S. Cl. ............ 23/253 TP; 23/230 B; 252/408

[51] Int. Cl.[2] .................... G01N 31/22; G01N 33/16

[58] Field of Search ..... 23/253 TP, 230 B; 252/408, 252/352

[56] References Cited

UNITED STATES PATENTS

| | | | |
|---|---|---|---|
| 2,935,504 | 5/1960 | King et al. | 252/8.5 A |
| 3,348,920 | 10/1967 | Ferru et al. | 23/253 TP X |
| 3,598,704 | 8/1971 | Dahlquist | 23/253 TP X |

OTHER PUBLICATIONS

Henry, "Clinical Chemistry Principles and Techniques", Harper and Row, New York, 1964, pp. 594–598.

*Primary Examiner*—Morris O. Wolk
*Assistant Examiner*—Arnold Turk
*Attorney, Agent, or Firm*—Wenderoth, Lind & Ponack

[57] ABSTRACT

A test strip for the detection of bilirubin in the body fluids, comprising an absorbing material, an organic sulfonic acid or salts thereof and a ferric salt. The test strip is useful in early diagnosis of hepatic diseases such as yellow jaundice or hepatitis.

5 Claims, No Drawings

TEST STRIP FOR HEPATIC DISEASES

This invention relates to a test strip for the detection of bilirubin, and to a composition therefor. More particularly, the present invention relates to a test strip for the detection of bilirubin, comprising an absorbing material, an organic sulfonic acid or salts thereof and a ferric salt, and to a composition for the detection of bilirubin, comprising an organic sulfonic acid or salts thereof and a ferric salt.

It is known that bilirubin increases in the body fluids such as urine, plasma or serum, especially in the urine, of patients with hepatic diseases such as yellow jaundice or hepatitis. Thus, detection of bilirubin can diagnose such diseases. A diagnostic strip used for such purpose, comprising trichloroacetic acid and a salt of non-volatile acid, is known (cf. Japanese Patent publication No. 10600/1956). However, since trichloroacetic acid is corrosive, the strip containing such reagent is corroded after long storage and the sensitivity in the color reaction is declined. Thus, the known test strip is not practically applicable. The present inventors have studied earnestly to overcome such problems and discovered that a test strip for the detection of bilirubin, comprising an absorbing material, an organic sulfonic acid or salts thereof and a ferric salt, is stable for long storage, and the sensitivity of the strip to bilirubin is high. In place of the trichloroacetic acid having corrosive properties, the use of organic sulfonic acids provides a greatly improved test strip for the detection of bilirubin. The present invention is based on these discoveries. Also, the composition comprising an organic sulfonic acid or salts thereof and a ferric salt can be practically used for such detection, though it is somewhat less convenient in practical use than the test strip, in view of the handling, stability and preservation.

The test strip for hepatic diseases in accordance with the present invention can be prepared by the usual method. An organic sulfonic acid or salts thereof and a ferric salt are first dissolved in water or an aqueous organic solvent at about room temperature. Then, an absorbing material is dipped in the solution for one minute to several minutes at about room temperature. The dipped absorbing material is withdrawn from the solution, and then dried in the air or at a temperature of from room temperature to about 80°C to give the desired test strip.

The organic sulfonic acids include substituted or unsubstituted aromatic sulfonic acids, aliphatic sulfonic acids, and salts thereof. More particularly, such sulfonic acids can be substituted or unsubstituted benzenesulfonic acids, substituted or unsubstituted naphthalenesulfonic acids, and aliphatic sulfonic acids (e.g. alkanesulfonic acid wherein the alkane moiety contains up to 3 carbon atoms). As the substituent on the aromatic ring of the sulfonic acid are mentioned lower alkyl group containing up to 3 carbon atoms, lower alkoxy group containing up to 3 carbon atoms, halogen atom (e.g. fluorine, bromine, chlorine) and nitro group. In general, water-soluble organic sulfonic acids are preferably employed. Typical examples of such sulfonic acid are naphthalene-$\alpha$-sulfonic acid, naphthalene-$\beta$-sulfonic acid, 2,6-naphthalenedisulfonic acid, 2,7-naphthalenedisulfonic acid, 1,5-naphthalenedisulfonic acid, 1,6-naphthalenedisulfonic acid, o-xylenesulfonic acid, m-xylenesulfonic acid, p-xylenesulfonic acid, o-fluorobenzenesulfonic acid, m-bromobenzenesulfonic acid, p-chlorobenzenesulfonic acid, benzenesulfonic acid, o-toluenesulfonic acid, m-toluenesulfonic acid, p-toluenesulfonic acid, o-nitrobenzenesulfonic acid, m-nitrobenzenesulfonic acid, p-nitrobenzenesulfonic acid, methanesulfonic acid, and salts thereof (e.g. alkali metal salts thereof). There is no particular limitation as to the concentration of these sulfonic acids, though it is usually at a concentration of about 1–15%.

As the ferric salt are mentioned organic or inorganic ferric salts. Examples of such salt are preferably ferric chloride, ferric bromide ferric fluoride, ferric sulfate, ferric ammonium sulfate, ferric nitrate, ferric phosphate, ferric oxalate, ferric citrate, and ferric ammonium citrate. These salts can be used in a wide range of concentrations, e.g. 1–50%.

The absorbing material to be dipped in a solution containing the organic sulfonic acid or salts thereof and the ferric salt can be a sheet of paper, a piece of cloth, and a stick of porous wood. Examples of the kind of such absorbing paper are filter paper, blotting paper, adsorbent paper (e.g. silica gel paper, alumina paper), ion-exchange cellulose paper (e.g. phosphonomethyl cellulose paper, sulfoethyl cellulose paper, phospho cellulose paper, carboxymethyl cellulose paper, guanidoethyl cellulose paper, diethylaminoethyl cellulose paper, aminoethyl cellulose paper, ecteola cellulose paper (obtained by treating cellulose with epichlorhydrin and triethanolamine), p-aminobenzyl cellulose paper, polyethyleneimine cellulose paper), ion-exchange Sephadex paper, and ion-exchange resin paper. The shape of the absorbing material is not particularly limited, though it is usually used in a strip form. Among the absorbing materials, ion-exchange cellulose papers, particularly diethylaminoethyl cellulose paper, can be preferably used.

The organic sulfonic acid or salts thereof and the ferric salt may be converted into a suitable dosage form such as solutions, suspensions, tablets, granules, pills, or powders in a conventional manner. It is obvious, of course, that diluents, excipients, dispersing agents, auxiliary substances, coating materials, etc., not affecting the color reaction, may be incorporated into these compositions without changing the basis of the present invention. Further, a surfactant such as polyvinyl alcohol or polyethylene glycol may be added for the stabilization of the test strip itself.

The color change is detectable only by dissolving such composition in the body fluids containing bilirubin. Also, the color reaction may be effected in such a manner that a tablet containing an organic sulfonic acid or salts thereof and a tablet containing a ferric salt, normally separately packed, are combined in a specimen of body fluids such as urine, plasma, or serum. Usually, the test strip is used by dipping it in a test sample or by impregnating a test sample into the test strip, whereby detectable color change results. The test strip can be used in a more convenient form such as, for example, being held on a plastic sheet.

The test strips and the compositions in accordance with the present invention are very stable for a long time, and the sensitivity to bilirubin is not declined after long storage. Also, the color formed by the color reaction does not fade for several tens of minutes. Thus, they are useful in diagnosis of hepatic diseases such as hepatitis or yellow jaundice. Further, it is to be noted that the test strip of the invention can be used in the detection of phenylketone bodies such as phenylpyruvic acid which is indicative of phenylketonuria, inborn disorder of phenylalanine metabolism. The color reactions to birilubin and phenylpyruvic acid can be differentiated by the specific color formed and its fading time. That is, the test strip of the invention changes color to greengreenish blue in the presence of birilubin (1 mg/100 ml) and grayish blue in the presence of phenylpyruvic acid, (20–50 mg/100 ml) and the fading time is about several tens of minutes in the former case and several minutes in the latter case.

The following working examples will be given only to illustrate the embodiments of the invention, and it is to be construed that the technical scope of the invention is not limited by the examples given, many equivalent variations of which are possible without departing from the concept of the invention.

EXAMPLE 1

To a 50% aqueous ferric ammonium sulfate solution (10 ml) was added naphthalene-β-sulfonic acid (2.10 g) and the solution was made up to 20 ml by addition of water. A strip (5 ×10 cm) of filter paper (Toyo filter paper NO. 131) was dipped in this solution at room temperature for one minute, withdrawn from the solution, and dried in a dessiccator at 60–80°C for 10 minutes and at room temperature for 60 minutes under reduced pressure. The resultant pale yellowish brown strip was cut into pieces (0.7 × 0.7 cm), pasted on a sheet of vinyl chloride with a suitable adhesive agent, and stored under dried conditions. A fixed amount of standard plasma bilirubin (Versatol Pediatric) was dissolved in normal urine and the urine solution was used as a standard. The test strip obtained above was dipped in the urine solution, and the color change of the strip was determined one minute after the strip was withdrawn from the solution. The strip turned pale yellowish green~greenish blue at a concentration of bilirubin of more than 1 mg/100 ml. The formed color did not fade for 30 minutes.

EXAMPLE 2 m-Xylenesulfonic acid (2.5 g) was added to a 1% aqueous ferric chloride solution (10 ml) and the mixture was made up to 20 ml with water. A strip (5 × 10 cm) of diethylaminoethyl cellulose paper DE-81 (Whatman Co.) was dipped in this solution for 1 minute at room temperature, and dried in the air, after which the procedure of EXAMPLE 1 was followed to give the desired test strip. The strip obtained showed good sensitivity to bilirubin.

EXAMPLE 3 p-Toluenesulfonic acid (1.25 g) was added to a 25% aqueous ferric ammonium sulfate solution (10 ml) and the solution was made up to 20 ml with water. A piece (5 × 7 cm) of silica gel paper M3F 8860 (Carl Chleicher & Chüll Co.) was dipped in the above solution for one minute, and then the procedure of EXAMPLE 1 was followed to give the desired test strip.

EXAMPLE 4

Using 1,5-naphthalenedisulfonic acid disodium salt in place of naphthalene-β-sulfonic acid, the same procedure as described in EXAMPLE 1 was carried out to give the desired test strip of good sensitivity and stability.

EXAMPLE 5

Using p-nitrobenzenesulfonic acid in place of naphthalene-β-sulfonic acid, the same procedure as described in EXAMPLE 1 was carried out to give the test strip for the detection of bilirubin.

EXAMPLE 6

Using a 20% aqueous ferric sulfate solution in place of 50% ferric ammonium sulfate, the procedure of EXAMPLE 1 was followed to give the desired test strip.

EXAMPLE 7

Ferric chloride hexahydrate (1 g) and m-xylenesulfonic acid dihydrate (6 g) were dissolved in a 3% (w/w) solution (20 ml) of polyvinyl alcohol (polymerization degree=2,000). A piece (5 × 10 cm) of thick filter paper (Toyo filter paper No. 514) was dipped in this solution, and dried in the air. The test strip thus obtained showed the same sensitivity to bilirubin with that of the test strip obtained in EXAMPLE 1.

What we claim is:

1. A test strip for the detection of bilirubin, comprising an absorbing material, an organic sulfonic acid or salts thereof and a ferric salt.

2. A test strip for the detection of bilirubin according to claim 1, wherein the organic sulfonic acid is a member selected from the group consisting of substituted or unsubstituted benzenesulfonic acids, substituted or unsubstituted naphthalenesulfonic acids and alkanesulfonic acids wherein the alkane moiety contains up to 3 carbon atoms.

3. A test strip for the detection of bilirubin according to claim 1, wherein the substituent on the aromatic ring of the sulfonic acid is a member selected from the group consisting of lower alkyl group containing up to 3 carbon atoms, lower alkoxy group containing up to 3 carbon atoms, halogen atom and nitro group.

4. A test strip for the detection of bilirubin according to claim 1, wherein the organic sulfonic acid is a member selected from the group consisting of naphthalene-α-sulfonic acid, naphthalene-β-sulfonic acid, 2,6-napthalenedisulfonic acid, 2,7-naphthalenedisulfonic acid, 1,5-naphthalenedisulfonic acid, 1,6-naphthalenedisulfonic acid, o-xylenesulfonic acid, m-xylenesulfonic acid, p-xylenesulfonic acid, o-fluorobenzenesulfonic acid, m-bromobenzenesulfonic acid, p-chlorobenzenesulfonic acid, benzenesulfonic acid, o-toluenesulfonic acid, m-toluenesulfonic acid, p-toluenesulfonic acid, o-nitrobenzenesulfonic acid, m-nitrobenzenesulfonic acid, p-nitrobenzenesulfonic acid, methanesulfonic acid and inorganic salts thereof.

5. A test strip for the detection of bilirubin according to claim 1, wherein the ferric salt is a member selected from the group consisting of ferric chloride, ferric bromide, ferric fluoride, ferric sulfate, ferric ammonium sulfate, ferric nitrate, ferric phosphate, ferric oxalate, ferric citrate and ferric ammonium citrate.

* * * * *